United States Patent Office

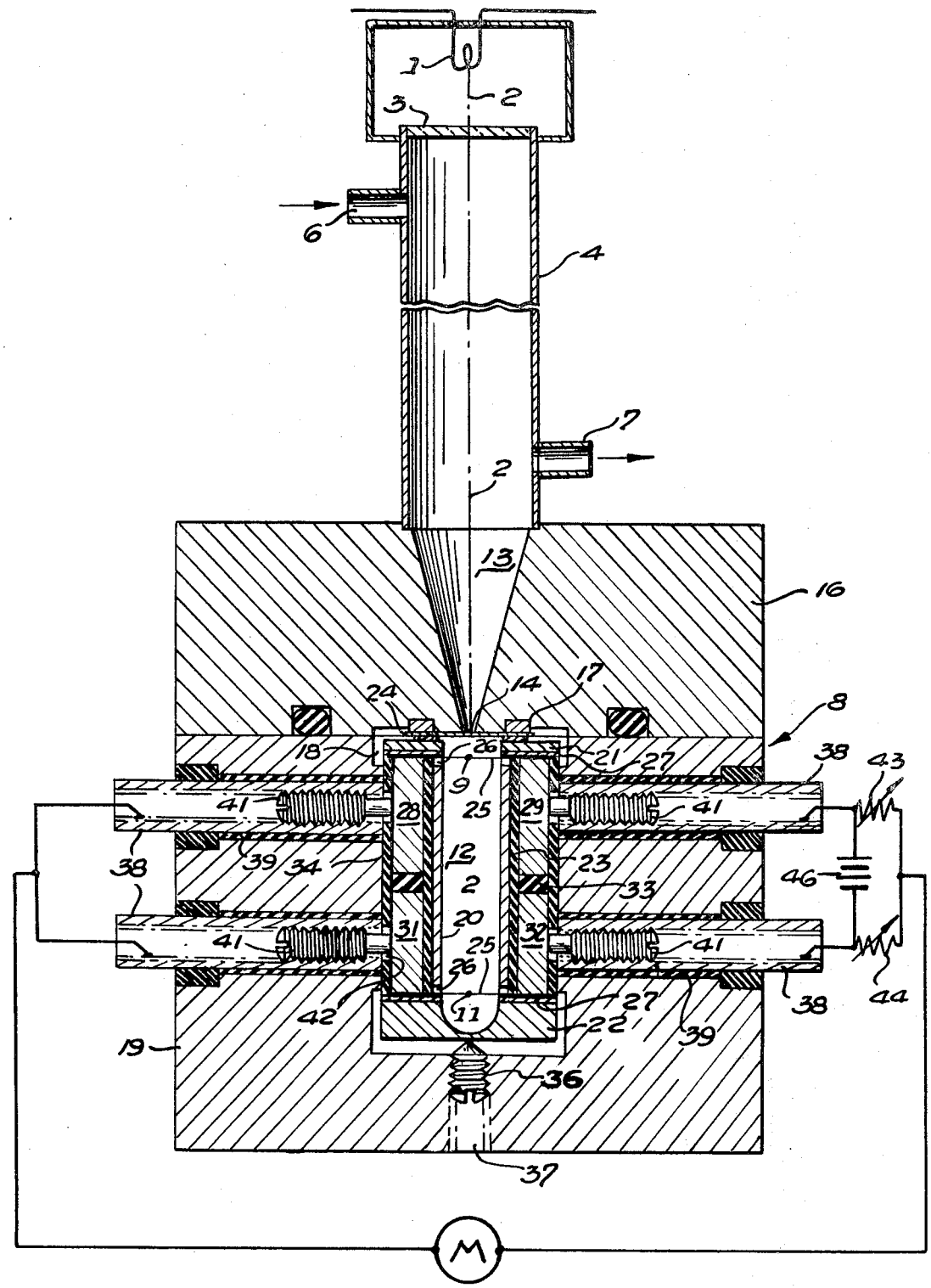

3,517,189
Patented June 23, 1970

3,517,189
INFRARED GAS ANALYZER WHEREIN THE DETECTOR COMPRISES TWO OPTICALLY SPACED THERMISTERS SEPARATED BY AN ABSORBING GAS
Emilio G. Meyer, Milan, Italy, assignor to Mine Safety Appliances Italiana, S.p.A., Milan, Italy
Filed May 17, 1967, Ser. No. 639,107
Int. Cl. G01j *3/42, 5/24;* G01n *21/26*
U.S. Cl. 250—43.5                                  6 Claims

ABSTRACT OF THE DISCLOSURE

This invention relates to the infrared analysis of a gaseous mixture for determining the presence and concentration of a specified component that is capable of absorbing a significant amount of infrared radiation. A single beam of radiant energy from a suitable source is passed through the sample mixture and then through a detector unit in which two heat sensing elements are arranged a certain distance apart in optical sequence and in which a predetermined concentration of the gaseous component to be detected is disposed between the sensing elements. The sensing elements are connected in an electrical bridge circuit that is balanced when the sample mixture contains none of the component to be detected, so that the later addition of that component to the sample will affect mainly the response of the first sensing element only, whereas variations in other components of the sample mixture, in the source of radiant energy, or in the optical characteristics of the system will affect the response of both sensing elements in nearly equal proportions.

BACKGROUND OF THE INVENTION

One common type of infrared analyzer uses two parallel beams of radiant energy, one of which is a reference beam and the other an analytical beam, the two beams being generally modulated one against the other to impinge alternately on two side by side sensing elements. There are presently available modulated single beam instruments that achieve selectivity to a particular gas by having separate pneumatic detectors in tandem, with the second detector receiving less energy than the first. There are also single beam instruments that provide compensation to background and environmental factors by exposing the detector alternately to two regions of the spectrum, one of which is absorbed by the gas to be detected and the other which is adsorbed by the background gas. Both of these types of detectors require a modulated or interrupted beam.

It is among the objects of the present invention to provide a simpler instrument without loss of selectivity or sensitivity, in which a single beam of radiant energy is transmitted without modulation or mechanical interruption first through the sample gas to be tested and then directed so as to impinge upon two sensing elements arranged in optical sequence.

SUMMARY OF THE INVENTION

In accordance with this invention, a beam of radiant energy from a suitable source is passed through a sample cell containing the gas mixture to be analyzed and is then passed through a detector unit containing two separate temperature responsive resistances, such as thermistors, arranged in optical sequence. The detector unit is preferably a single sealed chamber with the first thermistor near the energy input end of the chamber and the second thermistor near the opposite end. The chamber is filled with a predetermined concentration of the gaseous component that it is desired to detect and measure (or with a gas that absorbs infrared energy in the same wavelength as that component) mixed with some non-absorbing gas. In this arrangement, the first thermistor will always receive more radiant energy in a specific portion of the spectrum than the second thermistor, because some energy in that portion will be absorbed by the component under investigation in the sealed space between the two thermistors. The thermistors are connected in a Wheatstone Bridge circuit that is initially balanced with a sample gas containing none of the component under investigation. If the composition of the sample later changes to include some of that component, its presence will reduce the radiation reaching the first thermistor but will not significantly affect the radiation reaching the second thermistor, because the energy now absorbed in the sample by the component under investigation was previously absorbed by the same component in the sealed detector unit. In other words, the presence and concentration of the component can be measured by the unbalance of the bridge circuit, reflecting a change in the differential heating of the first and second thermistors from the differential that prevailed when the sample was free of the component in question. The first thermistor, therefore, acts as a detector element and the second one as a reference element, so that a change in the temperature differential between them after they are initially balanced is responsive substantially solely to the presence of the component under investigation in the sample mixture and is not affected by changes in other ambient conditions.

BRIEF DESCRIPTION OF THE DRAWING

A preferred embodiment of the invention is illustrated in the accompanying drawing, which shows, partly in diagrammatic form and partly in section, an elevation of an infrared analyzer of the type herein referred to.

BRIEF DESCRIPTION OF THE PREFERRED EMBODIMENT OF THE INVENTION

Referring to the drawing, a conventional radiant energy source is shown in the form of a filament 1, which is adapted to be connected to a source of electric current (not shown) to produce radiant energy covering the desired spectrum. This energy is directed as a beam or bundle of rays along an optical axis 2 through an infrared transmitting window 3 into a sample cell 4, through which the gas or gaseous mixture to be analyzed can be passed through openings 6 and 7. The radiant energy leaving the sample cell enters a detector unit 8, where it falls on thermistors 9 and 11 in a sealed chamber 12.

The detector unit 8 also includes a radiant energy funnel 13, preferably having highly reflective side walls disposed at a suitable angle to the optical axis to permit the maximum amount of radiation to fall on the thermistors and the space immediately surrounding them. In entering chamber 12, the radiation passes through an infrared transparent window 14, which is sealed in the funnel body 16 by a lead gasket 17. The lead gasket tends to reduce the thermal shock on the window when intense radiation first strikes it.

Chamber 12 is formed within a recess 18 in detector body 19 and completely sealed from the outside atmosphere by the gaskets referred to below. Most of the chamber wall is formed by the inner surface of a cylindrical sleeve 20, which is gold plated to increase its reflectance. This sleeve is axially supported within the recess by flange discs 21 and 22 (the latter being imperforate) at opposite ends and is laterally supported by a surrounding insulating sleeve 23. Flange disc 21 is sealed against window 14 by gasket 24. Thermistors 9 and 11 are supported on thin wires 25 at opposite ends of sleeve 20, the wires extending through notches 26 in the sleeve 20 beyond the chamber and being clamped between a gasket 27 and one of a pair of electrical contact elements 28, 29 and 31, 32. Gaskets 27 also space and insulate the wires 25 from the flanges 21 and 22. The contact elements 28, 29 and 31, 32 are axially separated by a rubber ring 33 and are circumferentially separated by cylindrical segments of insulating material (not shown), so that each contact element is in separate electrical contact with a separate end of a thermistor wire 25. The contact elements are also insulated from the detector body 19 by an insulating sleeve 34 and from flange discs 21 and 22 by gaskets 27. A screw 36 in a threaded counterbore 37 in the bottom of detector body 19 provides axial sealing pressure. Electrical contact between the thermistors and the external electrical circuit is obtained through hollow conducting terminals 38 supported by insulating sleeves 39 and provided with internal threads to receive contact screws 41. The latter extend through openings 42 in sleeve 34 to engage the contact elements.

Suitable electrical connections, shown diagrammatically in the drawing, connect each thermistor as a separate arm of a Wheatstone bridge circuit, which also includes variable resistances 43 and 44, a battery 46, and a measuring device M. Of cource, other conventional measuring circuits and devices can be used.

When the detector unit is assembled, chamber 12 is filled with a mixture of the gas to be detected (or a gas absorbing infrared radiation over substantially the same portion of the spectrum as that component) and a nonabsorbing gas, such as argon, xenon, or krypton. Preferably, the concentration of the subject component in the detector chamber is slightly in excess of its maximum expected concentration in the sample gas to be analyzed.

In operating this apparatus, the bridge circuit is initially balanced in the absence of the subject component in the sample chamber, but with the background component or components present. Under such circumstances, the first thermistor will receive more radiant energy in a portion of the spectrum than the second thermistor, because of infrared absorption by the subject component in the detector chamber. Since the first thermistor is at the energy input end of that chamber, it is little affected by such absorption, but the second thermistor at the opposite end of the chamber is affected to a maximum extent.

After the bridge circuit has been balanced under the above conditions, if a sample of gas containing a significant amount of the component to be detected (as well as the background component or components) is passed through the sample chamber, the radiation reaching the first thermistor will be less than reached it under the previously balanced condition when the background component or components alone was present, because of absorption by the subject component in the sample cell. The second thermistor, however, will receive as much radiant energy as before, because what is now absorbed in the sample cell by the subject component therein was previously absorbed in the detector chamber by that same component sealed in the chamber. As a result, the temperature relationship between the two thermistors will change, unbalancing the bridge by an amount proportional to the concentration of the subject component in the sample cell.

Continued use of the apparatus tends to raise the temperature of the gas in the detector chamber until a condition of equilibrium is reached in which the heat given off by the gas through the detector body is equal to that introduced by the incoming radiation. This sensible heat affects both thermistors; but, because of the construction of the detector unit, the temperature of the gas in the chamber tends to be substantially uniflurm and to affect both thermistors equally. Similarly, a change in the radiant energy given off by the source 1, or other changes in the ambient conditions, tend to affect the two thermistors equally and not to change the measurement of the component being analyzed in the sample cell.

In another form of the invention (not shown), the two thermistors are disposed in optical sequence in separate sealed chambers, at least one of which includes a gaseous mixture containing the component under investigation (or a gas absorbing infrared radiation in substatially the same wavelength as that component).

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. An infrared analyzer for measuring a given component in a gas mixture, comprising a source of infrared radiation, a sample cell for holding the mixture to be analyzed in the path of a beam of infrared radiation from the source, a detector unit for receiving the beam after it has passed through the sample cell, the detector unit including a detector body provided with a recess, a metal sleeve supported axially in the recess by metal flange members at each end and supported radially in the recess by a plurality of concentrically disposed members that include, respectively, a first electrically insulating sleeve and a plurality of electrical contact members and a second electrically insulating sleeve, the space bounded by the metal sleeve and flange members forming a detector chamber, the chamber containing gas means that absorbs infrared radiation in the same portion of the spectrum as the given component, means for sealing the gas means in the chamber, a first temperature responsive electrical resistance element mounted in the chamber adjacent the beam input end thereof and a second such element mounted in the chamber adjacent the opposite end thereof, both resistance elements being in electrical contact with a respective one of said contact members and located in the path of the beam in spaced optical sequence from each other, and an electrical circuit including the two resistance elements for measuring the temperature differential between those elements first in the absence and then in the presence of the given component in the mixture in the sample cell.

2. An infrared analyzer according to claim 1, in which said gas means include the given component mixed with a nonabsorbing gas, the concentration of the component in said mixture being in excess of its concentration in the sample mixture to be analyzed.

3. An infrared analyzer according to claim 1, in which the electrical resistance elements are thermistors.

4. An infrared analyzer for measuring a given component in a gas mixture, comprising a source of unmodulated infrared radiation, a sample cell for holding the mixture to be analyzed in the path of a beam of such unmodulated radiation from the source, a detector unit for receiving the beam of unmodulated radiation after it has passed through the sample cell, the detector unit including a chamber containing two temperature responsive electrical resistance elements in the form of thermisters located in the path of the beam in spaced optical sequence from each other and also containing gas disposed between the resistance elements for absorbing infrared radiation in the same absorption band of the absorption spectrum as the given component, the first resistance element being located adjacent the radiation input end of the chamber where it is responsive to substantially the entire spectrum of infrared radiation entering the chamber from the sample cell, the second resistance element being located towards the opposite end of the unit where it is responsive to substantially the same radiation as the first resistance element minus the radiation absorbed by the radiation absorbing gas between the two resistance elements, and an electrical circuit including the two resistance elements for measuring the temperature differential between those elements, first in the absence and then in the presence of the given component in the mixture in the sample cell.

5. An infrared analyzer according to claim 4, in which said radiation absorbing gas includes the given component.

6. An infrared analyzer in accordance with claim 4, in which said gas includes a mixture of the given component and a nonabsorbing gas, the concentration of the given component being in excess of its concentration in the mixture in the sample cell.

References Cited

UNITED STATES PATENTS

| | | | |
|---|---|---|---|
| 2,790,081 | 4/1957 | Munday | 250—43.5 |
| 2,813,010 | 11/1957 | Hutchins | 250—43.5 X |
| 2,924,713 | 2/1960 | Liston | 250—43.5 |

WILLIAM F. LINDQUIST, Primary Examiner